(12) United States Patent
Huang

(10) Patent No.: US 8,232,740 B2
(45) Date of Patent: Jul. 31, 2012

(54) CAPACITIVE CURRENT-SHARING CONTROL CIRCUIT FOR LED LAMP STRING

(75) Inventor: Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 390 days.

(21) Appl. No.: 12/732,093

(22) Filed: Mar. 25, 2010

(65) Prior Publication Data

US 2011/0234108 A1    Sep. 29, 2011

(51) Int. Cl.
*G05F 1/00*    (2006.01)
(52) U.S. Cl. ..... 315/294; 315/291; 315/187; 315/185 R; 315/192; 315/246; 315/312
(58) Field of Classification Search .................. 315/291, 315/294, 297, 169.1, 169.3, 187, 192, 185 R, 315/247, 312, 246, 318; 323/242, 267, 271, 323/276, 277, 351; 362/227, 249.02, 800; 363/21.01, 23, 56.1
See application file for complete search history.

(56) References Cited

U.S. PATENT DOCUMENTS

| | | | |
|---|---|---|---|
| 6,621,235 B2 * | 9/2003 | Chang | 315/216 |
| 8,080,947 B2 * | 12/2011 | Chang et al. | 315/282 |
| 8,111,015 B2 * | 2/2012 | Chang | 315/307 |
| 8,148,911 B2 * | 4/2012 | Chen et al. | 315/250 |
| 2009/0015759 A1 * | 1/2009 | Honbo | 349/69 |
| 2009/0108772 A1 * | 4/2009 | Teng et al. | 315/294 |
| 2011/0260642 A1 * | 10/2011 | Huang | 315/294 |

* cited by examiner

*Primary Examiner* — Haiss Philogene
(74) *Attorney, Agent, or Firm* — Chun-Ming Shih; HDLS IPR Services

(57) ABSTRACT

A capacitive current-sharing control circuit for LED lamp strings includes a signal generating unit, a control unit, a current-sharing unit, and a light-emitting unit. The control unit is used to control a driving voltage, which is generated from the signal generating unit, to drive the light-emitting unit, thus effectively providing a stable current source to the light-emitting unit to maintain illuminating brightness of the LED lamp strings.

4 Claims, 4 Drawing Sheets

CAPACITIVE CURRENT-SHARING CONTROL CIRCUIT FOR LED LAMP STRING

BACKGROUND OF THE INVENTION

1. Field of the Invention

The present invention relates to a capacitive current-sharing control circuit, and more particularly to a capacitive current-sharing control circuit which is used to provide a stable current source to LED lamp strings.

2. Description of Prior Art

A LED (light emitting diode) is a current-driving element and which has a characteristic of low-voltage unidirectional conduction. In addition, luminous flux variation of the LEDs varies with the current flow through the LEDs. Hence, it is essential to provide a stable current source to the LEDs, thus maintaining illuminating brightness of the LEDs.

At present, the current mirror is the most commonly used and simple current-sharing control circuit for the LEDs. As shown in FIG. 1 which is a circuit diagram of a prior art LED array circuit. The LED array includes a plurality of LED lamp strings 40 and a plurality of current mirrors 50, which are composed of a plurality of BJTs. In order to ensure that the current mirrors 50 are in proper operation, it is important to ensure that the characteristics of the BJTs are identical and each of the BJTs is operated in the active region.

However, due to different forward turn-on voltages of the light emitting diodes and different driving voltages of the BJTs, it is probably that the driving voltage of the current mirrors is less than the operating voltage in the active region. Hence, the currents flow through the LED lamp strings 40 are not the same, and this will result in different illuminating brightness of the LED lamp strings 40.

SUMMARY OF THE INVENTION

In order to solve the above-mentioned problems, a capacitive current-sharing control circuit for LED lamp strings is disclosed. The capacitive current-sharing control circuit is used to provide a stable current source to maintain illuminating brightness of the LED lamp strings.

The capacitive current-sharing control circuit includes a signal generating unit, a control unit, a current-sharing unit, and a light-emitting unit. The signal generating unit generates a driving voltage. The control unit is electrically connected to the signal generating unit to control the driving voltage. The current-sharing unit is electrically connected to the control unit, and the current-sharing unit is a capacitor. The light-emitting unit is electrically connected to the current-sharing unit. More particularly, the light-emitting unit includes a first LED lamp string and a second LED lamp string. The first LED lamp string has a plurality of light emitting diodes which are electrically connected in series in forward-bias direction. In addition, the second LED lamp string has a plurality of light emitting diodes which are electrically connected in series in reverse-bias direction. More particularly, the first LED lamp string is electrically connected in parallel to the second LED lamp string.

Therefore, the control unit controls the driving voltage to provide desired voltage to the light-emitting unit to provide a current-sharing control according to the current-sharing unit, thus providing effectively a stable current source to the light-emitting unit to maintain illuminating brightness of the LED lamp strings.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
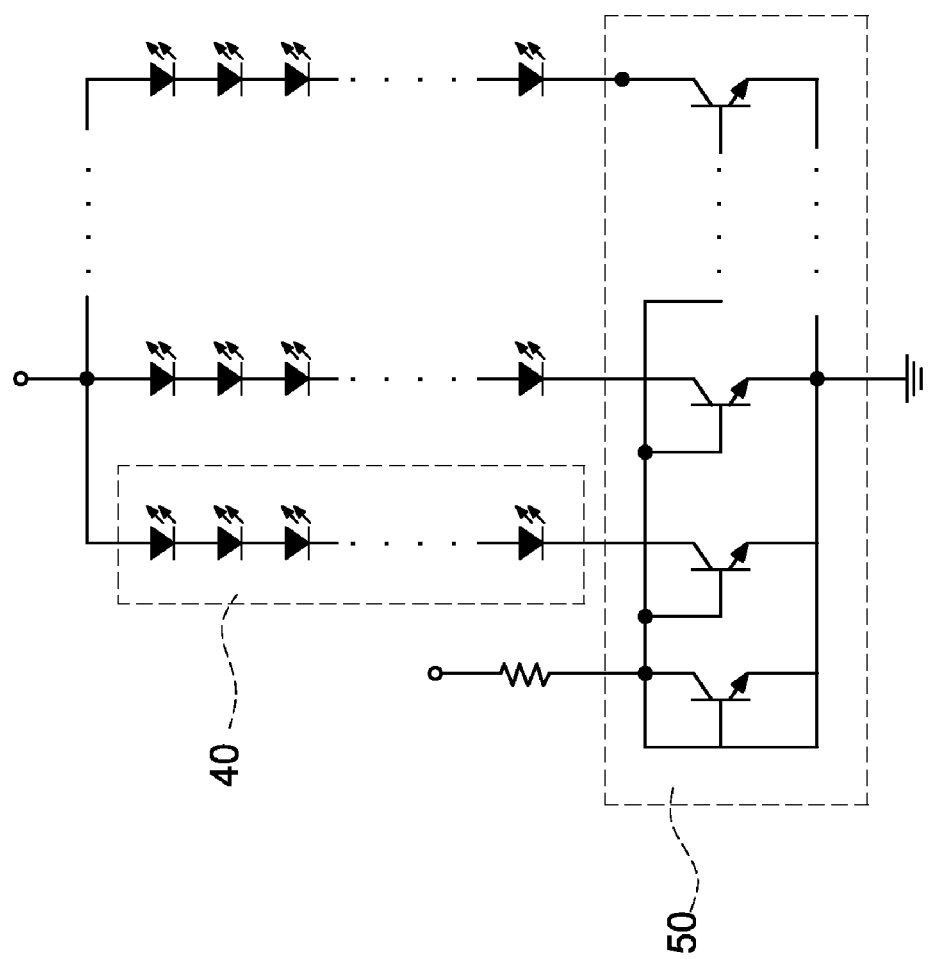
FIG. 1 is a circuit diagram of a prior art LED array circuit.

Reference will now be made to the drawing figures to describe the present invention in detail.

Figure 2:
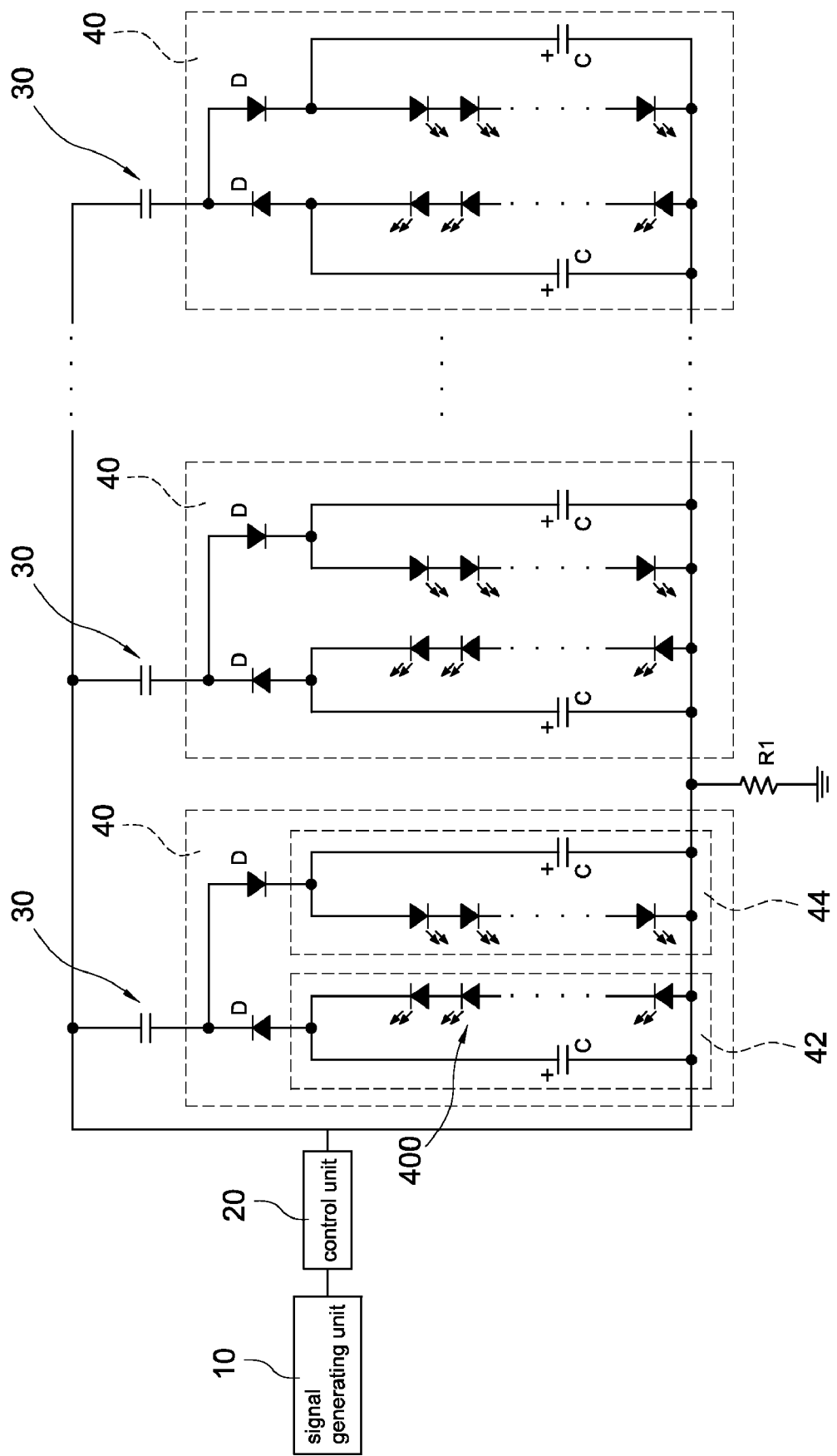
FIG. 2 is a circuit diagram of a capacitive current-sharing control circuit for LED lamp strings according to the present invention.

Reference is made to FIG. 2 which is a circuit diagram of a capacitive current-sharing control circuit for LED lamp strings according to the present invention. The current-sharing control circuit is used to provide a stable current source to a plurality of LED lamp strings to maintain illuminating brightness of the LED lamp strings. The capacitive current-sharing control circuit includes a signal generating unit 10, a control unit 20, at least one current-sharing unit 30, at least one light-emitting unit 40, and a current-limiting resistor R1.

Figure 3:
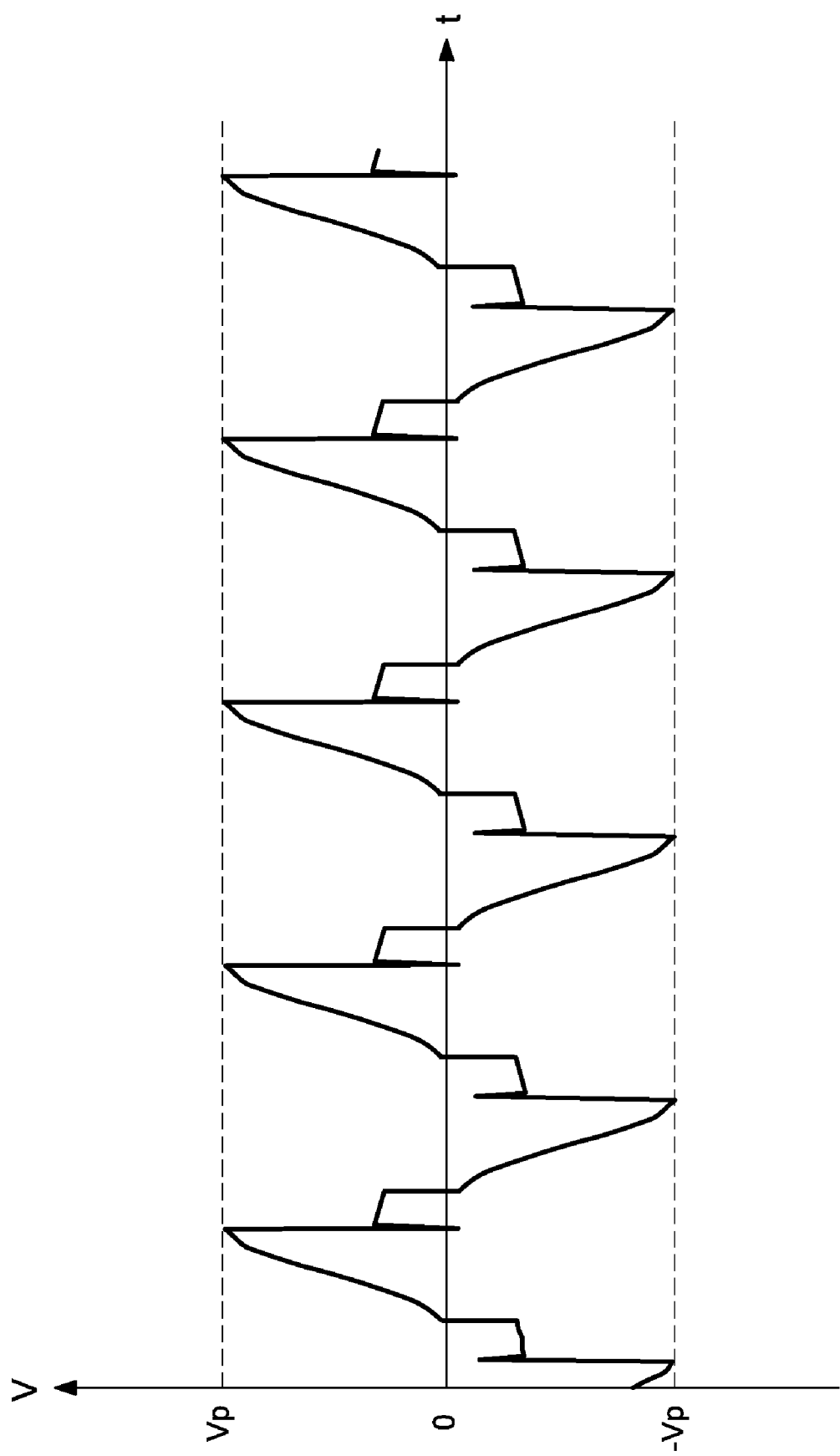
FIG. 3 is a voltage waveform of a driving voltage which is generated from a signal generating unit.

The signal generating unit 10 is used to provide a driving voltage (not labeled), and the driving voltage is provided to drive the capacitive current-sharing control circuit. In this embodiment, the driving voltage is a periodic AC signal (as shown in FIG. 3). In addition, the frequency of the driving voltage can be varied through a PWM control scheme to effectively control the turn-on time and the turn-off time of the light-emitting unit 40.

The control unit 20 is electrically connected to the signal generating unit 10 to receive the driving voltage. Also, the control unit 20 provides the driving voltage to drive the light-emitting unit 40, thus controlling illuminating brightness of the light-emitting unit 40.

The current-sharing unit 30 is electrically connected to the control unit 20. The current-sharing unit 30 is used to provide a stable current source to the light-emitting unit 40, thus maintaining illuminating brightness of the light-emitting unit 40. More particularly, the current-sharing unit 30 is a capacitor. In this embodiment, a 90-nF capacitor is used to achieve the current-sharing function.

The light-emitting unit 40 includes a first LED lamp string 42 and a second LED lamp string 44. More particularly, the first LED lamp string 42 is electrically connected in parallel to the second LED lamp string 44. The first LED lamp string 42 has a plurality of light emitting diodes 400 which are electrically connected in series in forward-bias direction. Also, the second LED lamp string 44 has a plurality of light emitting diodes 400 which are electrically connected in series in reverse-bias direction. Because the light emitting diodes 400 are electrically connected in series, the same current flow through all of the light emitting diodes 400, thus each of the light emitting diodes 400 has the same illuminating brightness.

In addition, the first LED lamp string 42 and the second LED lamp string 44 both have a protective capacitor C which is electrically connected in parallel to the light emitting diodes 400. These protective capacitors C are used to filter out abnormal voltage components, thus reducing influence of the abnormal pulsating voltage to the first LED lamp string 42 and the second LED lamp string 44.

The light-emitting unit 40 further includes two protective diodes D. One protective diode D is electrically connected between the current-sharing unit 30 and the first LED lamp string 42, and the other protective diode D is electrically connected between the current-sharing unit 30 and the second LED lamp string 44. These protective diodes D are used to prevent abnormal reverse voltage from breaking down the light emitting diodes 400.

Figure 4:
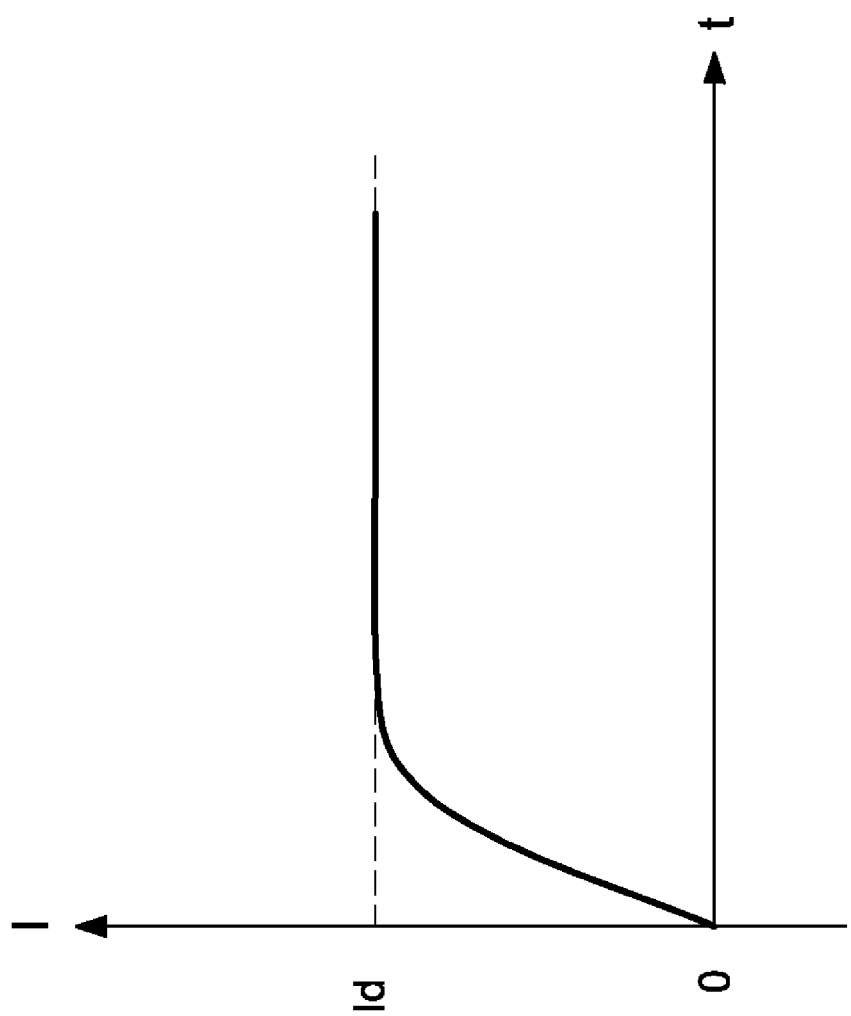
FIG. 4 is a current waveform of a current-sharing light emitting diode.

In practical operation, the signal generating unit 10 provides an AC voltage signal with a peak voltage Vp (as shown in FIG. 3) for rear-end circuits. Also, the AC voltage signal is controlled by the control unit 20 to effectively control illuminating brightness of the light-emitting unit 40. The turn-on voltage of the light emitting diode 400 is assumed as Vx. When the AC voltage signal is larger than the turn-on voltage Vx or smaller than the negative turn-on voltage −Vx, the capacitor of the current-sharing unit 30 is charged and discharged to effectively provide a stable driving current Id (as shown in FIG. 4) to the light-emitting unit 40, thus maintaining illuminating brightness of the light emitting diodes 400.

More particularly, the impedance of the current-sharing unit 30 is equal to an inverse of the capacitance multiplied by the operating frequency. Hence, the total branch impedance of the light-emitting unit 40 and the current-sharing unit 30 is the sum of the impedance of the current-sharing unit 30 and the impedance of the first LED lamp string 42 and the second LED lamp string 44. More particularly, the impedance of the current-sharing unit 30 increases whenever the capacitance of the current-sharing unit 30 increases. Also, the impedance of the first LED lamp string 42 and the second LED lamp string 44 relatively reduces. Accordingly, the impedance of the current-sharing unit 30 dominates the total branch impedance. When either the first LED lamp string 42 or the second LED lamp string 44 faults, the current can be significantly restrained through the current-sharing unit 30 to achieve the current-sharing function.

The current-limiting resistor R1 is electrically connected in series to the light-emitting unit 40 to limit the peak current flow through the first LED lamp string 42 and the second LED lamp string 44, thus preventing damaging the light-emitting unit 40.

In practical applications, multiple current-sharing units 30 can be combined in parallel with multiple light-emitting units 40 to form a large LED array module (as shown in FIG. 2). When one of the light emitting diodes 400 faults, the current flow through the branch increases. Hence, other light emitting diodes 400 connected in series to the damaged light emitting diode 400 are easily damaged due to the over-current condition. Accordingly, the current-sharing unit 30 can be used to effectively eliminate the transient high current; as a result, other light emitting diodes 400 can be normally operated under the rated current.

In conclusion, the capacitive current-sharing units 30 are used to achieve the current-sharing function. A very simple and economical circuit effectively provides a stable current to the light emitting diodes, thus maintaining illuminating brightness of the light emitting diodes, and more particularly increasing lifetime thereof.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A capacitive current-sharing control circuit for LED lamp strings, comprising:
   a signal generating unit generating a driving voltage;
   a control unit electrically connected to the signal generating unit to control the driving voltage;
   a current-sharing unit electrically connected to the control unit, wherein the current-sharing unit is a capacitor;
   a light-emitting unit electrically connected to the current-sharing unit, and comprising:
      a first LED lamp string having a plurality of light emitting diodes which are electrically connected in series in forward-bias direction; and
      a second LED lamp string having a plurality of light emitting diodes which are electrically connected in series in reverse-bias direction; wherein the first LED lamp string is electrically connected in parallel to the second LED lamp string;
   whereby the control unit controls the driving voltage to provide desired voltage to the light-emitting unit to provide a current-sharing control according to the current-sharing unit, thus providing effectively a stable current source to the light-emitting unit to maintain illuminating brightness of the LED lamp strings.

2. The capacitive current-sharing control circuit in claim 1, wherein the light-emitting unit comprises two protective diodes; one protective diode is electrically connected between the current-sharing unit and the first LED lamp string, and the other protective diode is electrically connected between the current-sharing unit and the second LED lamp string.

3. The capacitive current-sharing control circuit in claim 1, further comprising a current-limiting resistor electrically connected to the light-emitting unit to limit the current flowing through the light-emitting unit, thus prevent damaging the light-emitting unit.

4. The capacitive current-sharing control circuit in claim 1, wherein the light-emitting unit comprises two protective capacitors; one protective capacitor is electrically connected in parallel to the first LED lamp string, and the other protective capacitor is electrically connected in parallel to the second LED lamp string.

* * * * *